1

2,971,885

ANIMAL FEEDS

Herbert G. Luther, Warren M. Reynolds, and William C. Sherman, Terre Haute, Ind., assignors to Chas. Pfizer & Co., Inc., Brooklyn, N.Y., a corporation of Delaware No Drawing. Filed Sept. 10, 1958, Ser. No. 760,076

10 Claims. (Cl. 167—53)

This invention is concerned with a method of stimulating the growth of animals. It is also concerned with animal feeds which are effective in stimulating such growth, whereby meat production may be increased.

In particular, this invention is concerned with the treatment of domestic animals with certain synthetic derivatives of piperazine. The particular piperazine derivatives which have proven highly valuable are N-p-chlorobenzhydryl-N'-$\beta$-hydroxyethoxyethyl piperazine compounds including their salts with non-toxic organic or inorganic acids. This invention is also concerned with the treatment of domestic animals concurrently with the synthetic piperazine derivative and with a member of the group of broad spectrum antibiotics and/or diethylstilbestrol or other equivalent female sex hormone.

When reference is made herein to a broad spectrum antibiotic, this term is intended to include not only tetracycline, oxytetracycline, and chlortetracycline, but also biologically active salts and derivatives thereof. A variety of these compounds is known in the prior art and some of them are available commercially. When reference is made to a female sex hormone, this term is intended to include not only diethylstilbestrol, which is particularly useful, but also such materials as dienestrol, hexestrol, and various ethers or esters of these compounds.

It has been found that when a domestic animal is treated with one of the synthetic piperazine derivatives referred to above, there is a definite stimulation in the rate of growth of the animals as compared to animals of the same type who are fed on the same diet and do not receive the piperazine derivative supplement. Additionally, there is a general improvement in the quality of the meat which is produced by the animals treated in this manner. This is especially true of beef cattle raised by use of the present process, although other types of animals such as poultry, sheep and swine also benefit. Although individual animals may vary to some extent in their response to treatment according to the present invention, on the average a group of animals will show a definite improvement of the type indicated above.

It has also been found that when an animal is concurrently fed one of the synthetic piperazine derivatives referred to above and concurrently treated with one of the broad spectrum antibiotics, there is an even greater stimulation of growth than could be expected from the individual effects of the piperazine derivative and of the antibiotic when used alone. This favorable effect appears in increased rate of weight gain and improved feed efficiency but even more so in increase in quality of the meat that is produced, particularly from beef cattle.

It has similarly been observed that the use of one of the piperazine derivatives referred to above concurrently with the use of one of the female sex hormones is also highly and unusually effective in stimulating animal growth and improving feed efficiency and carcass grade, especially in cattle and lambs. This effect also appears to be more than could be anticipated from the effect of the piperazine derivative when used alone and of the female sex hormone when used alone.

When a combination of one of the piperazine derivatives referred to above, one of the broad spectrum antibiotics, and one of the female sex hormones is administered concurrently to a domestic animal, there is still a greater effect upon the growth rate feed efficiency and the quality of the meat produced by use of this method. Why such a combination should bring about additional and unexpected benefits in the growth of animals is not clear. Whether the mechanism of action of the individual materials differs in such a way that the stimulatory effect of the individual materials functions on a different mechanism of the animal's body is not clear. In any case, the effect in question has been well established by examination of animals treated with the multicomponent composition.

The desired growth stimulation may be achieved by administration of one of the piperazine derivatives referred to above or of one of the compositions referred to above by the oral route in the form of tablets, capsules, solutions, suspensions, or admixed with one or more of the components of the animals' feed or in the animal's drinking water or other liquid fed to the animal or by implants. Alternatively, the components of the compositions referred to above may be administered together or separately by other routes. For instance, oxytetracycline may be administered intramuscularly, while the piperazine derivative is administered by the oral route or vice versa. The femal sex hormone component of the compositions referred to above may also be used orally or by implantation under the animal's skin. It is often found most convenient to add the piperazine compound or the compositions referred to above to the animal's feed at a suitable level to assure the desired effect.

The piperazine derivative described above may be compared conveniently by the method described by Morren et al., Bulletin des Société Chimique Belges, vol. 60, pp. 282–285 (1951) utilizing N-p-chlorobenzhydryl-piperazine and a reagent such as $\beta$-hydroxyethoxyethyl bromide in which case the hydrobromide salt is formed. This salt, may, of course, be converted to other salts or to the base with relative ease. The broad spectrum antibiotics are, of course, available by known methods or may be purchased. This is also true of the female sex hormones and their derivatives which are referred to above.

The amount of the piperazine derivative which may be administered to the animals will vary with the method of administration (whether orally or by implant), the species of animal, etc. When 10, 20 and 40 milligrams of N-p-chlorobenzhydryl - N' - hydroxyethoxyethyl-piperazine dihydrochloride (Atarax) per 100 pounds of body weight have been implanted in lambs, they have shown significant increases in body weight at all levels without any signs of toxicity. Likewise, cattle which received implants calculated at 4, 8 and 12 milligrams per 100 pounds of body weight responded satisfactorily to all levels of implant without signs of toxicity.

The composition of the implant obviously must be non-toxic and should help to control the assimilation of the active material. Since Atarax is a relatively watersoluble compound, implants at high levels can produce toxic symptoms because of a too rapid release of the material. Therefore, some means for slowing down the absorption of the piperazine derivative is desirable. This may be achieved by using a solid tablet of the material. However, repeat implants containing smaller amounts of the derivative may also be employed.

When the piperazine derivative is orally administered, it has been found desirable to mix about 0.2 to about 30 g. into a ton of feed. The proportion in the feed will vary with the amount that is desirable to administer to the animal and with the feed composition of the particular animal. Although the response to these materials will vary somewhat with the particular species of animal, this can be readily determined by an alteration of the proportions and the range indicated above may be made with ease. If capsules or tablets of the material are used, they may be administered at a rate indicated above for use in feed.

A standard feed composition to which the materials described above may be added varies somewhat depending upon the animal for which the product is to be used, the stage of growth of the animal, the economies of feedstuff materials at the moment and other factors. In general, a source of carbohydrate, some protein, minerals and vitamins are highly desirable. Various sources of carbohydrates may be used for this purpose. Ground grain and grain by-products are particularly useful, but various other materials are also of value, such as molasses and other sugar by-products. Grains may be used to supply a certain amount of protein for feeds and this may be supplemented, if desired, by the addition of various animal by-products, such as fish meal, meatscraps, etc. Vegetable protein material, such as soybean oil meal, peanut meal, cottonseed meal, etc., is also of use. Vitamins, such as A, B, riboflavin, vitamin B complex, and others of this nature are also effective. Sources of mineral, such as bonemeal, limestone, and mineral supplements also have a desirable function in the complete feeds. Various government publications, particularly those of the National Research Council, give recommended nutrient levels for various types of animals. Other publications are also available giving this type of information. In general, the process and compositions of the present invention work best when the animal is receiving a reasonably nutritious diet.

When animals are treated in accordance with the present invention, there results an increase in the rate at which they gain weight, particularly in the early rapid-growth stages of their lives. For instance, the animals have been found to gain weight at an early stage of their growth at a rate of 5 to 10% or more greater than normal. This increase in growth rate has generally been achieved when the compounds of the piperazine derivative type are used, and even greater effects have been achieved with the combinations of two agents referred to above. The combination of a piperazine derivative, an antibiotic, and a female sex hormone has shown not only unusually effective growth promotion and improved feed efficiency but also an unexpected increase in the quality of the meat thus produced. This is particularly true of beef cattle. It should be noted that individual animals vary to some extent in their degree of response to the materials described above and the results indicated are those achieved on an average with a substantial number of animals.

The preferred type of antibiotic for use in the process and compositions of the present invention is an antibiotic of the tetracycline type. This includes tetracycline, oxytetracycline, chlortetracycline, bromtetracycline. When reference is made to these antibiotics, it is intended to include the basic forms of these antibiotics as well as non-toxic salts and complexes with organic and inorganic acids, metals, organic bases, polyvalent metal salts and so forth. A variety of these compounds are described in the prior art. If used in feed, the antibiotics are conveniently provided at a level of from about 5 to about 50 g. per ton of feed. If the antibiotic is provided in part of the feed such as a high protein concentrate, then the antibiotic level in this material is increased in proportion to the ratio of the concentrate to the whole feed. If implanted, from about 25 to about 200 mg. of antibiotic is used (in an assimilable form) for a steer of 500 to 1000 lbs. and proportionately smaller amounts for smaller animals. In this form, the antibiotic need only be administered once during the fattening and finishing period.

It has further been found particularly favorable to administer to domestic animals not only the broad spectrum antibiotic and one of the piperazine derivatives referred to above, but also a female sex hormone of synthetic or naturally occurring type particularly of the diethylstilbestrol type, such as dienestrol, hexestrol, or the methyl ethers of these compounds. In general, if these materials are used in feeds, from about 2 to about 50 mg. is used in the daily feed of a steer and proportionately lower levels for smaller animals. If implanted, the level used is about 1 mg. to 8 mg. per 100 lbs. of body weight and the material need only be administered once during the fattening and finishing period. This material, which may be administered to the animals orally or by implantation, serves to appreciably increase the effectiveness of the antibotic and piperazine derivative combination upon the rate of growth of the animal. For instance, lambs which were treated by implantation with both diethylstilbestrol pellets and oxytetracycline hydrochloride pellets and were at the same time fed a nutritious diet containing N-p-chlorobenzhydryl-N'-hydroxyethoxyethyl piperazine dihydrochloride, have been found to gain weight at an appreciably greater rate than animals which had not been so treated with the combination of agents or which were treated with comparable levels of any combination of two of these agents. This unusual reaction of the three materials in their effect on animal growth rate and feed efficiency is most valuable.

As indicated above, the broad spectrum antibiotic and the piperazine derivative may be most readily administered by the oral route. However, the antibiotic may also be used in the form of injections by the intramuscular route or in the form of implantation of the material into the muscle of the animal. The antibiotic then functions over a considerable period of time together with the piperazine derivative administered by the same or a different route to achieve stimulation of the growth of the animal. Implantations of this material need only be made once during the fattening and finishing period when the animal is being prepared for market.

The same considerations apply to treatment of the animal with combinations of the broad spectrum antibiotic, the piperazine derivative and the diethylstilbestrol-type hormone material. The hormone material may be administered to the animals by implantation of pellets at a rate of approximately .02 mg. to about 2 mg. per kilogram of body weight. This assures the activity of the hormone over a period of several weeks during which it will coact with the antibiotic and the piperazine derivative administered by a similar or different route to the animal. Again, the response of an individual species of animal may vary somewhat and this may require adjustment of the level within the range indicated above to obtain the maximum desirable effect.

It should be noted that, in addition to the desirable increase in rate of growth of the animals, there has also been observed an unexpected and highly favorable increase, in many cases, in the quality of the carcass as determined by standard methods of grading. This, of course, increases the economic value of the compositions and process of the present invention, since a higher grade animal, such as beef, lamb, etc., commands a higher price when the animal is marketed.

The following examples are given by way of illustration and are not to be considered as the sole embodiments of this invention. It is to be understood that protection hereof is only to be limited by the specific wording of the appended claims.

EXAMPLE I

A herd of Hereford steers averaging about 500 pounds each was divided into groups of eight animals each with 16 animals as controls. The animals were weighed individually and at 28 day intervals thereafter. They were all fed on a high roughage diet consisting of corn and corn-cob meal ground to one-half inch particles, the animals having as much of this material available as they desired. In addition, each of the animals received corn and corn cob meal at rate of 2 lbs. twice daily and a highly nutritious protein supplement at the rate of 1.5 pounds twice daily for each animal. This supplement had the following composition: Soybean oil meal 62%, dried molasses 10%, urea 2%, dehydrated alfalfa 20%, dicalcium phosphate 2%, salt trace mineralized 2.25%, ground limestone 1.75%, vitamin A 5000 international units per pound.

The animals in the various groups were treated in various ways with individual materials and the combinations of these materials, which is the subject of this invention.

In the following table is summarized the rate of gain of the animals in each group over a period of 84 days.

| Diet | Average Daily Gain in Weight (Pounds) | Feed Efficiency (Pounds of Feed/ Pound of Gain in Weight) |
|---|---|---|
| (1) Control | 1.72 | 11.75 |
| (2) DES [1] implant (36 mg.) | 1.82 | 11.20 |
| (3) Feed containing oxytetracycline, 80 mg. per day average intake | 1.79 | 11.40 |
| (4) DES implant (36 mg.) plus oxytetracycline, 80 mg | 1.91 | 10.70 |
| (5) Atarax,[2] 2.4 mg. in daily feed | 1.75 | 11.70 |
| (6) DES Implant (36 mg.) plus 2.4 mg. Atarax per day | 2.16 | 9.56 |
| (7) 80 mg. per day oxytetracycline, 2.4 mg. per day Atarax | 1.95 | 10.40 |
| (8) DES implant (36 mg.) plus oxytetracycline, 80 mg. plus 2.4 mg./day Atarax in feed | 2.19 | 9.66 |

[1] Diethylstilbestrol.
[2] Registered trademark of Chas. Pfizer & Co., Inc. for its brand of N-p-chlorobenzhydryl-N'-hydroxyethoxyethyl-peperazine dihydrochloride.

It may readily be seen from the above table that the use of a combination of the broad-spectrum antibiotic and the piperazine derivative results in an appreciable increase in the rate of growth of the animals and in feed efficiency, when compared to controls treated with either one of these materials. The combination of hormone, antibiotic and piperazine derivative displays an unusually high level of coaction in its effect on feed efficiency and growth rate, as compared to any combination of two of these agents. The substantially greater feed efficiency was quite unexpected and is of considerable commercial importance.

EXAMPLE II

The beef cattle of the above experiment were changed to a high concentrate diet having the following composition: corn and cob-meal, self fed, plus the protein supplement of Example I fed at the rate of 1.5 lb. twice daily.

This was done to fatten the animals for marketing. The groups of animals were continued on the treatment described in the experiment above; that is, the first group was not given any supplement of antibiotic or piperazine derivative, the second received the same level of antibiotic, the third the same level of the piperazine derivative and the fourth the same level of a piperazine derivative and a broad-spectrum antibiotic. In the following table is summarized the results of the experiment for a period of 168 days.

| Diet | Average Daily Gain in Weight (Pounds) | Feed Efficiency (Pounds of Feed/ Pound of Gain in Weight) |
|---|---|---|
| (1) Control | 2.13 | 10.96 |
| (2) DES implant (36 mg.) | 2.40 | 10.08 |
| (3) Feed containing oxytetracycline, 80 per mg. per day average intake | 2.02 | 11.36 |
| (4) DES implant (36 mg.) plus oxytetracycline (80 mg./day) | 2.52 | 9.50 |
| (5) Atarax 2.4 mg. in daily feed | 2.24 | 10.51 |
| (6) DES implant (36 mg.) plus Atarax (2.4 mg./day) | 2.49 | 9.66 |
| (7) 80 mg. per day oxytetracycline, 2.4 mg. per day Atarax | 2.33 | 9.86 |
| (8) DES implant (36 mg.) plus oxytetracycline (80 mg./day) plus Atarax (2.4 mg./day 2.60) | 2.57 | 9.56 |

Thus, there is a very definite and high level of coaction between the antibiotic and the piperazine derivative in stimulating the growth of these animals and in improving feed efficiency.

EXAMPLE III

A group of Texas wether white-faced feeder, crossbreed lambs weighing approximately 65 pounds were divided into eight lots of 12 animals each. These animals were fed a pelleted feed of 3/8 inch particle size having the following composition:

| | Percent |
|---|---|
| Sun-cured alfalfa | 64.9 |
| Yellow corn meal | 25 |
| Molasses | 10 |
| Vitamin A supplement [1] | 0.1 |

[1] To supply 2270 I. U. vitamin A/lb. of ration.

The animals had as much of this feed available as required and also as much mineralized salt as required. The lambs were fed over a period of 69 days and the groups received (in addition to the feed) a variety of treatments which are outlined in the following table.

| Diet | Average Daily Gain in Weight (Pounds) | Feed Efficiency (Pounds of Feed/ Pound of Gain in Weight) | Carcass Grade |
|---|---|---|---|
| (1) No supplementation | .370 | 9.47 | 7.91 |
| (2) 50 mg. oxytetracycline hydrochloride implant | .384 | 9.17 | 8.18 |
| (3) 50 mg. oxytetracycline implant plus 3 mg. DES implant | .477 | 7.35 | 7.91 |
| (4) 50 mg. oxytetracycline plus 3 mg. DES plus .24 grams Atarax/ton | .473 | 7.54 | 7.50 |
| (5) 50 mg. oxytetracycline plus 3 mg. DES 1.2 grams Atarax/ton | .547 | 6.98 | 8.18 |
| (6) 50 mg. oxytetracycline plus 3 mg. DES plus 6 grams Atarax/ton | .498 | 7.19 | 8.17 |

[1] Diethylstilbestrol.

It is apparent from the above table that there is a definite stimulatory effect on the growth rate, feed efficiency and carcass grade of lambs through the use of the feed compositions of this invention as compared to the effect of the individual components. This also applies to other materials such as beef cattle, poultry, swine, etc.

EXAMPLE IV

A group of Hereford steers averaging 750 pounds each was divided into lots of 10 animals each. They were all fed on a ration of ground corn and cob meal, self-fed, and hand-fed alfalfa hay at a rate of 3 lbs. per day and 3 lbs. per day of protein supplement of the following composition: Soybean oil meal 59%, molasses 10%, urea 5%, dehydrated alfalfa meal 20%, dicalcium phosphate 2.0%, salt trace-mineralized 2.25%, ground limestone 1.75% and vitamin A 5,000 I.U./lb. The additives were mixed with the protein supplement of various lots of cattle to supply the levels indicated below.

The following table is a summary of the 110 day average daily gains and feed efficiency and carcass grade of each lot.

| Diet | Av. Daily Gain, Lb. | Feed Efficiency | Carcass Grade |
|---|---|---|---|
| (1) No. supplementation | 2.83 | 9.19 | 10.9 |
| (2) DES—10 mg./day in feed | 2.86 | 8.80 | 10.7 |
| (3) DES—(10 mg./day) plus oxytetracycline—80 mg./day in feed | 2.88 | 8.57 | 9.7 |
| (4) DES (10 mg./day) plus oxytetracycline (80 mg./day) plus Atarax (2.4 mg./day) | 3.13 | 8.16 | 10.1 |

It is apparent from the above data that there is a definite stimulation of growth and feed efficiency resulting from the addition of the piperazine derivative to estrogen and broad spectrum antibiotic.

EXAMPLE V

A group of lambs were fed on a nutritious diet. Half of the group had its diet supplemented with Atarax at a level of 2 grams per ton of feed for a period of 70 days. The average daily gain in weight of the lambs was determined as was the efficiency of utilization of the feed that was consumed. In the following table is given the results of this test.

| Diet | Average Daily Gain in Weight | Pounds of Feed/ Pound of Gain |
|---|---|---|
| Control | 0.415 | 9.38 |
| Atarax | 0.531 | 7.35 |
| Percent improvement | 28 | 21.5 |

It is obvious from this table that a very substantial gain in weight is induced by the addition of the piperazine compound to the animal diet.

EXAMPLE VI

A group of beef cattle averaging about 750 pounds by weight was fed on a nutritious diet as indicated above. This herd was divided into a number of smaller groups each of which received a supplement to the diet. The first group received an implantation of 36 milligrams of diethylstilbestrol at the beginning of the test period which ran for 112 days. The second group received the implant and 1.25 milligrams per day of Atarax in its feed. The third group received the same amount of diethylstilbestrol and 2.5 milligrams per day of Atarax. The fourth group received the diethylstilbestrol and 10 milligrams per day of Atarax. The fifth group received diethylstilbestrol and 500 milligrams per day of Atarax in its feed. In the following table is listed the results of this test.

| Treatment | Average Daily Gain in Weight | Pounds Feed/ Pounds Gain |
|---|---|---|
| Diethylstilbestrol | 2.25 | 10.41 |
| DES+1.25 mg./day Atarax | 2.83 | 9.12 |
| DES+2.5 mg./day Atarax | 2.68 | 9.16 |
| DES+10.0 mg./day Atarax | 2.82 | 9.16 |
| DES+50 mg./day Atarax | 2.74 | 8.68 |
| DES+500 mg./day Atarax | 2.61 | 9.16 |

It is apparent from the above table that the piperazine derivative used in conjunction with the femal sex hormone confers on the animals an unusual increase in rate of growth. It is also apparent that there is a definite increase in efficiency of feed utilization. Insofar as increase in growth rate is concerned, there seems to be little advantage in using more than 10 milligrams of the piperazine derivative in the animal's daily feed. However, there is some increase in feed efficiency at levels as high as 50 milligrams per day.

EXAMPLE VII

A group of black-faced wether lambs weighing approximately 65 pounds each were divided into lots of 12 animals each. These animals were fed a pelleted feed of ⅜ inch particle size having the following composition:

*Composition of rations*

| Ingredient: | Composition, gms. |
|---|---|
| Dehydrated alfalfa meal | 5.0 |
| Gr. corn cobs | 35.0 |
| Soybean oil meal | 5.0 |
| Gr. yellow corn | 37.5 |
| Urea | 1.0 |
| Bone meal | 1.5 |
| Cane molasses | 15.0 |
| Trace minerals | .05 |
| Vitamin A–10–P | 10.0 |
| | 110.05 |
| Protein, percent | 10.2 |

The animals had as much of this feed as required and also as much mineralized salt as required. They were fed over a period of 53 days and received a variety of treatment as outlined in the following table:

| | Control | DES 3 mg. Implant | Atarax | | | |
|---|---|---|---|---|---|---|
| | | | Oral, 1.2 gm./ton | Oral, 2.0 gm./ton | Impl., 15 mg. | Impl., 15 mg.+ DES Impl. |
| Lot No. | 1 | 2 | 3 | 4 | 5 | 6 |
| No. Wethers | 24 | 12 | 12 | 12 | 12 | 12 |
| Average Daily Gains, pounds | .352 | .450 | .499 | .411 | .441 | .588 |
| Growth index | 100 | 128 | 142 | 117 | 125 | 167 |
| Lb. Feed/Lb. Gain | 8.01 | 6.36 | 7.29 | 7.81 | 7.21 | 6.15 |
| Percent impr. in Feed Efficiency | | 21 | 9 | 2.5 | 10 | 23 |
| Carcass Grade [1] | 9.63 | 10.80 | 10.78 | 9.91 | 10.00 | 10.78 |

[1] Carcass grade numerical rating: Low choice 10; high good 9.

From the figures in the preceding table, it is apparent that there is a significant increase in the growth of animals receiving Atarax treatment, and there is a very definite and high level of coaction between female sex hormones and Atarax when the animal is treated with an implant of these materials.

EXAMPLE VIII

Nine steers were divided into two groups of five and four steers each. They were fed a daily diet consisting of 3 pounds of alfalfa hay, 2 pounds of protein supplement and as much ground ear corn as they desired. The group of five steers was implanted with 30 mgs. of Atarax and the animals were observed for a period of 67 days. The following table indicates the results that were noted:

| | Control | Atarax Implant, 30 mg. |
|---|---|---|
| No. Steers | 4 | 5 |
| Av. Daily Gains, lbs. | 1.70 | 1.86 |
| Growth Index | 100 | 109 |
| Dressing, percent | 60.51 | 60.36 |
| Carcass Grade [1] | 8.75 | 9.80 |

[1] Carcass grade numerical rating: Low choice, 10; high good, 9.

It may be readily seen from the above table that the growth index of the treated animals was 9% greater than the growth index of the untreated animals.

EXAMPLE IX

Sixty-four pigs, approximately 9 to 10 weeks of age, were divided into four groups of 16 each. They were fed a 14% protein ration containing meat, bone scraps and alfalfa meal having the following composition:

*Ration (with 10 gms. terramycin/ton)*

| | |
|---|---|
| Corn | 80.35 |
| 45% SBOM | 12.50 |
| 50% meat and bonescraps | 3.00 |
| Dehydrated alfalfa meal | 2.00 |
| Iodized salt | .50 |
| Dicalcium phosphate | 1.00 |
| Trace mineral mix H | .25 |
| Vitamin mix H | .35 |
| TM-10 | .05 |
| | 100.0 |

The groups were then treated as indicated in the following table:

| | Control | Oral, 40 mg./ton | Oral, 400 mg./ton | Implant, 15 mg. |
|---|---|---|---|---|
| No. Pigs | 16 | 16 | 16 | 16 |
| Av. Daily Gain | 1.54 | 1.58 | 1.63 | 1.62 |
| Growth Index | 100 | 103 | 106 | 105 |

From the above table, a significant increase in the growth index has been achieved through the use of treatment with Atarax.

EXAMPLE X

Twenty-two pigs were divided into two groups of 11 each. Both groups received the basal ration set out in Experiment 9. One group was used as a control; each member of the other group received an implant of 15 mg. of Atarax. The control group gained an average of 1.53 pounds daily. The treated group gained an average of 1.62 pounds daily. This experiment was conducted over an 8-week period and showed that the treatment with Atarax resulted in a 6% increase in growth index in the treated animals.

This application is a continuation-in-part of the then co-pending application Serial No. 677,207 filed on August 9, 1957, which, in turn, was a continuation-in-part of the then copending application Serial No. 658,244, filed on May 10, 1957. Applications Serial No. 677,207 and Serial No. 658,244 are now abandoned.

What is claimed is:

1. A composition which comprises a nutritive animal feed together with a growth stimulating amount of N-p-chlorobenzhydryl-N'-hydroxyethoxyethylpiperazine.

2. A composition which comprises a nutritive animal feed together with a growth stimulating amount of N-p-chlorobenzhydryl-N'-hydroxyethoxyethylpiperazine and a tetracycline-type antibiotic.

3. A composition which comprises a nutritive animal feed together with a growth stimulating amount of N-p-chlorobenzhydryl-N'-hydroxyethoxyethylpiperazine and a female sex hormone.

4. A composition which comprises a nutritive animal feed together with a growth stimulating amount of N-p-chlorobenbhydryl - N' - hydroxyethoxyethylpiperazine, a tetracycline-type antibiotic, and a female sex hormone.

5. A process for stimulating the growth of animals which comprises administering to said animals in conjunction with a nutritious diet a growth stimulating amount of N-p-chlorobenzhydryl-N'-hydroxyethoxyethylpiperazine.

6. A process as claimed in claim 1 wherein a tetracycline-type antibiotic is administered concurrently to said animals.

7. A process as claimed in claim 1 wherein a female sex hormone is administered concurrently to said animals.

8. A process as claimed in claim 1 wherein a tetracycline-type antibiotic and a female sex hormone are administered concurrently to said animals.

9. A process as claimed in claim 5 wherein N-p-chlorobenzhydryl-N'-hydroxyethoxyethylpiperazine is administered to the animals by means of implants.

10. A process as claimed in claim 7 wherein N-p-chlorobenzhydryl-N'-hydroxyethoxyethylpiperazine is administered by means of implant.

References Cited in the file of this patent

Sizemore et al.: Poultry Science, XXXII, No. 4, July 1953, pp. 618–23.

Berger: Jr. Pharmacology and Exptl. Therapeutics 112 (1954), pp. 413–423.

Drug and Cosmetic Ind., June 956, pp. 823–25.

Dixon Springs Exp. Sta., Univ. Ill. Progress Report, 956, pp. 15–16.